United States Patent
Canberk et al.

(10) Patent No.: US 11,865,444 B2
(45) Date of Patent: Jan. 9, 2024

(54) TRACKING HAND GESTURES FOR INTERACTIVE GAME CONTROL IN AUGMENTED REALITY

(71) Applicants: Ilteris Canberk, Marina Del Rey, CA (US); Dmytro Kucher, Odessa (UA); Dmytro Hovorov, Luhansk (UA); Artur Sydoran, Uzhhorod (UA)

(72) Inventors: Ilteris Canberk, Marina Del Rey, CA (US); Dmytro Kucher, Odessa (UA); Dmytro Hovorov, Luhansk (UA); Artur Sydoran, Uzhhorod (UA)

(73) Assignee: Snap Inc., Santa Monica, CA (US)

( * ) Notice: Subject to any disclaimer, the term of this patent is extended or adjusted under 35 U.S.C. 154(b) by 139 days.

(21) Appl. No.: 17/024,800

(22) Filed: Sep. 18, 2020

(65) Prior Publication Data
US 2022/0088476 A1 Mar. 24, 2022

(51) Int. Cl.
*A63F 13/428* (2014.01)
*A63F 13/213* (2014.01)
(Continued)

(52) U.S. Cl.
CPC .......... *A63F 13/428* (2014.09); *A63F 13/213* (2014.09); *A63F 13/26* (2014.09);
(Continued)

(58) Field of Classification Search
CPC ...... A63F 13/428; A63F 13/213; A63F 13/26; A63F 13/537; A63F 2300/8082;
(Continued)

(56) References Cited

U.S. PATENT DOCUMENTS 8,799,821 B1 8/2014 Rose et al.
9,024,842 B1 5/2015 Gomez et al.
(Continued)

FOREIGN PATENT DOCUMENTS

CN 106199511 A 12/2016
EP 3116615 A1 1/2017
(Continued)

OTHER PUBLICATIONS

Cas and Chary VR: https://www.youtube.com/watch?_8VqQfrHG94 , viewed on Dec. 4, 2021, published online on Feb. 25, 2020 (Year: 2020).
(Continued)

*Primary Examiner* — Malina D. Blaise
(74) *Attorney, Agent, or Firm* — Culhane Meadows PLLC; Stephen J. Weed

(57) ABSTRACT

Example systems, devices, media, and methods are described for presenting an interactive game in augmented reality on the display of a smart eyewear device. A hand tracking utility detects and tracks the location of hand gestures in real time, based on high-definition video data. The detected hand gestures are compared to library of hand gestures and landmarks. Examples include synchronized, multi-player games in which each device detects and shares hand gestures with other devices for evaluation and scoring. A single-player example includes gesture-shaped icons presented on a virtual scroll that appears to move toward an apparent collision with corresponding key images, awarding points if the player's hand is located near the apparent collision and the detected hand shape matches the moving icon.

20 Claims, 15 Drawing Sheets

(51) Int. Cl.
  *A63F 13/26* (2014.01)
  *A63F 13/537* (2014.01)
  *G06F 3/01* (2006.01)
  *G06F 3/042* (2006.01)
  *G06F 3/04817* (2022.01)
  *G06T 11/60* (2006.01)

(52) U.S. Cl.
  CPC .......... *A63F 13/537* (2014.09); *G06F 3/017* (2013.01); *G06F 3/0425* (2013.01); *G06F 3/04817* (2013.01); *G06T 11/60* (2013.01); *A63F 2300/8082* (2013.01); *G06T 2210/12* (2013.01); *G06T 2210/21* (2013.01)

(58) Field of Classification Search
  CPC .... G06F 3/017; G06F 3/0425; G06F 3/04817; G06T 11/60; G06T 2210/12; G06T 2210/21
  See application file for complete search history.

(56) References Cited

U.S. PATENT DOCUMENTS

| | | | |
|---|---|---|---|
| 9,098,739 | B2 | 8/2015 | Mutto et al. |
| 9,207,771 | B2 | 12/2015 | Antoniac |
| 9,235,051 | B2 | 1/2016 | Salter et al. |
| 9,459,454 | B1* | 10/2016 | The ................. G02B 27/0176 |
| 9,541,996 | B1 | 1/2017 | Baxter et al. |
| 9,552,673 | B2 | 1/2017 | Hilliges et al. |
| 9,990,029 | B2 | 6/2018 | Kochi |
| 9,996,983 | B2 | 6/2018 | Mullins |
| 10,057,400 | B1 | 8/2018 | Gordon et al. |
| 10,146,414 | B2 | 12/2018 | Heater |
| 10,220,303 | B1* | 3/2019 | Schmidt ............... A63F 13/814 |
| 10,372,228 | B2 | 8/2019 | Mao et al. |
| 10,394,334 | B2 | 8/2019 | Wang |
| 10,509,461 | B2 | 12/2019 | Mullen |
| 10,579,207 | B2 | 3/2020 | Piya et al. |
| 10,642,369 | B2 | 5/2020 | Yer et al. |
| 10,782,779 | B1 | 9/2020 | Eubank et al. |
| 10,852,838 | B2 | 12/2020 | Bradski et al. |
| 10,853,991 | B1* | 12/2020 | Yan ..................... G06F 3/011 |
| 10,902,250 | B2 | 1/2021 | Konin et al. |
| 10,909,762 | B2 | 2/2021 | Karalis et al. |
| 10,936,080 | B2 | 3/2021 | Marcolina et al. |
| 11,086,126 | B1 | 8/2021 | Gollier et al. |
| 11,275,453 | B1 | 3/2022 | Tham et al. |
| 11,277,597 | B1 | 3/2022 | Canberk et al. |
| 11,294,472 | B2 | 4/2022 | Tang et al. |
| 11,320,911 | B2 | 5/2022 | Schwarz et al. |
| 11,334,179 | B2 | 5/2022 | Li et al. |
| 11,380,021 | B2 | 7/2022 | Nakata |
| 11,481,025 | B2 | 10/2022 | Shimizu et al. |
| 11,494,000 | B2 | 11/2022 | Katz et al. |
| 11,500,512 | B2 | 11/2022 | Reithmeir et al. |
| 11,520,399 | B2 | 12/2022 | Kang et al. |
| 11,531,402 | B1 | 12/2022 | Stelzenberg |
| 11,546,505 | B2 | 1/2023 | Canberk |
| 11,631,228 | B2 | 4/2023 | Fieldman |
| 2005/0271279 | A1 | 12/2005 | Fujimura et al. |
| 2007/0220108 | A1* | 9/2007 | Whitaker ............ H04M 1/6041 709/217 |
| 2008/0219502 | A1 | 9/2008 | Shamaie |
| 2010/0085317 | A1 | 4/2010 | Park et al. |
| 2011/0213664 | A1 | 9/2011 | Osterhout et al. |
| 2012/0027252 | A1* | 2/2012 | Liu ..................... G06V 10/50 382/103 |
| 2012/0027263 | A1 | 2/2012 | Liu et al. |
| 2012/0086729 | A1 | 4/2012 | Baseley et al. |
| 2012/0113223 | A1 | 5/2012 | Hilliges et al. |
| 2012/0194644 | A1 | 8/2012 | Newcombe et al. |
| 2012/0327117 | A1 | 12/2012 | Weller et al. |
| 2013/0328927 | A1 | 12/2013 | Mount et al. |
| 2014/0043211 | A1 | 2/2014 | Park |
| 2014/0212000 | A1 | 7/2014 | Yagcioglu et al. |
| 2014/0225918 | A1 | 8/2014 | Mittal et al. |
| 2014/0306993 | A1 | 10/2014 | Poulos et al. |
| 2014/0347289 | A1 | 11/2014 | Suh et al. |
| 2014/0361988 | A1 | 12/2014 | Katz et al. |
| 2014/0368533 | A1 | 12/2014 | Salter et al. |
| 2015/0049017 | A1 | 2/2015 | Weber et al. |
| 2015/0073753 | A1 | 3/2015 | Rameau |
| 2015/0091824 | A1 | 4/2015 | Hori |
| 2015/0097719 | A1 | 4/2015 | Balachandreswaran et al. |
| 2015/0109197 | A1 | 4/2015 | Takagi |
| 2015/0199780 | A1 | 7/2015 | Beyk |
| 2015/0317833 | A1 | 11/2015 | Ebstyne et al. |
| 2015/0331576 | A1 | 11/2015 | Piya et al. |
| 2015/0370321 | A1 | 12/2015 | Lundberg |
| 2016/0033770 | A1 | 2/2016 | Fujimaki et al. |
| 2016/0035134 | A1 | 2/2016 | Tanaka et al. |
| 2016/0098093 | A1* | 4/2016 | Cheon ............... H04N 21/41265 345/156 |
| 2016/0260251 | A1 | 9/2016 | Stafford et al. |
| 2016/0261834 | A1 | 9/2016 | Li et al. |
| 2016/0306431 | A1 | 10/2016 | Stafford et al. |
| 2017/0003746 | A1 | 1/2017 | Anglin et al. |
| 2017/0014683 | A1* | 1/2017 | Maruyama ............. G06F 3/011 |
| 2017/0028299 | A1* | 2/2017 | The ....................... G06F 3/012 |
| 2017/0053447 | A1 | 2/2017 | Chen et al. |
| 2017/0097687 | A1 | 4/2017 | Pinault et al. |
| 2017/0123487 | A1 | 5/2017 | Hazra et al. |
| 2017/0124713 | A1 | 5/2017 | Jurgenson et al. |
| 2017/0140552 | A1 | 5/2017 | Woo et al. |
| 2017/0270711 | A1 | 9/2017 | Schoenberg |
| 2017/0293364 | A1 | 10/2017 | Wang |
| 2017/0295446 | A1 | 10/2017 | Shivappa |
| 2017/0323488 | A1 | 11/2017 | Mott et al. |
| 2017/0352184 | A1 | 12/2017 | Poulos et al. |
| 2017/0357334 | A1 | 12/2017 | Balan et al. |
| 2018/0005443 | A1 | 1/2018 | Poulos et al. |
| 2018/0024641 | A1* | 1/2018 | Mao ..................... A63F 13/428 382/103 |
| 2018/0039852 | A1* | 2/2018 | Nakamura ............. G06T 7/194 |
| 2018/0075659 | A1 | 3/2018 | Browy et al. |
| 2018/0196503 | A1 | 7/2018 | Ikeda .................... G06V 40/28 |
| 2018/0259775 | A1* | 9/2018 | Ono ................... G06F 3/04815 |
| 2018/0329209 | A1* | 11/2018 | Nattukallingal ....... G02B 27/01 |
| 2019/0025595 | A1* | 1/2019 | Fukuda ................. G06F 3/0346 |
| 2019/0102927 | A1* | 4/2019 | Yokokawa ............. G06T 13/40 |
| 2019/0122085 | A1 | 4/2019 | Tout et al. |
| 2019/0146598 | A1 | 5/2019 | Peri |
| 2019/0155394 | A1* | 5/2019 | Bedikian ............ G06F 3/04815 |
| 2019/0220098 | A1 | 7/2019 | Gupta |
| 2019/0299059 | A1 | 10/2019 | Case, Jr. et al. |
| 2019/0318544 | A1 | 10/2019 | Skidmore et al. |
| 2019/0324553 | A1 | 10/2019 | Liu et al. |
| 2019/0325651 | A1* | 10/2019 | Bradner .................. G06F 3/011 |
| 2019/0361521 | A1* | 11/2019 | Stellmach ........... G06F 3/04842 |
| 2019/0377416 | A1 | 12/2019 | Alexander |
| 2020/0005026 | A1 | 1/2020 | Andersen et al. |
| 2020/0064924 | A1 | 2/2020 | Poupyrev et al. |
| 2020/0097065 | A1* | 3/2020 | Iyer ........................ G06F 3/017 |
| 2020/0218423 | A1* | 7/2020 | Ohashi ................ G06F 3/04186 |
| 2020/0311396 | A1* | 10/2020 | Pollefeys ................. G06T 19/20 |
| 2020/0312029 | A1 | 10/2020 | Heinen et al. |
| 2020/0387228 | A1* | 12/2020 | Ravasz ................ G06F 3/04842 |
| 2021/0019036 | A1 | 1/2021 | Wang et al. |
| 2021/0041702 | A1 | 2/2021 | Kimura et al. |
| 2021/0090337 | A1* | 3/2021 | Ravasz ................... G06T 19/006 |
| 2021/0096726 | A1* | 4/2021 | Faulkner ............... G06F 1/1686 |
| 2021/0174715 | A1 | 6/2021 | Bazarevsky et al. |
| 2021/0181938 | A1 | 6/2021 | Hassan et al. |
| 2021/0208698 | A1* | 7/2021 | Martin .................... G06F 3/012 |
| 2021/0209153 | A1* | 7/2021 | Zhang ..................... G06F 3/017 |
| 2021/0263593 | A1 | 8/2021 | Lacey |
| 2021/0275914 | A1 | 9/2021 | Wu et al. |
| 2021/0286502 | A1* | 9/2021 | Lemay ................... G06F 3/017 |
| 2021/0334524 | A1 | 10/2021 | Guo et al. |
| 2021/0373650 | A1 | 12/2021 | Kang et al. |
| 2021/0397266 | A1 | 12/2021 | Gupta et al. |
| 2022/0088476 | A1 | 3/2022 | Canberk et al. |
| 2022/0103748 | A1 | 3/2022 | Canberk |
| 2022/0139056 | A1 | 5/2022 | Fieldman |

(56) References Cited

U.S. PATENT DOCUMENTS

| | | | |
|---|---|---|---|
| 2022/0171479 A1 | 6/2022 | Chappaz et al. | |
| 2022/0179495 A1 | 6/2022 | Agrawal et al. | |
| 2022/0206102 A1 | 6/2022 | Brown | |
| 2022/0206588 A1 | 6/2022 | Canberk et al. | |
| 2023/0082789 A1* | 3/2023 | Lu ........................ | G06F 3/017 |
| | | | 345/156 |
| 2023/0117197 A1 | 4/2023 | Stolzenberg | |

FOREIGN PATENT DOCUMENTS

| | | |
|---|---|---|
| EP | 3699736 A1 | 8/2020 |
| WO | 2015192117 A1 | 12/2015 |

OTHER PUBLICATIONS

Engadget: "Google Glass Gesture Recognition by OnTheGo Platforms at CES 2014 : Engadget", Jan. 8, 2014 (Jan. 8, 2014), XP055859805, Retrieved from the Internet: URL:https://www.youtube.com/watch?v=d_jl_ZxPECg [retrieved on Nov. 11, 2021] 00:39s, 00:55s, 01:00-01:10s.

International Search Report and Written Opinion for International Application No. PCT/US2021/051109, dated Dec. 10, 2021 (Dec. 10, 2021)—17 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN 978-3-642-39061-6, p. 740; figure 4.

Partial International Search Report and Written Opinion for International Application No. PCT/US2021/047637, dated Jan. 7, 2022 (Jan. 7, 2022)—10 pages.

International Search Report and Written Opinion for International Application No. PCT/US2021/033642, dated Aug. 30, 2021 (Aug. 30, 2021)—11 pages.

Cirulis Arnis: "Large Scale Augmented Reality for Collaborative Environments", Jul. 10, 2020 (Jul. 10, 2020), Computer Vision—ECCV 2020 : 16th European Conference, Glasgow, UK, Aug. 23-28, 2020 Proceedings; [Lecture Notes in Computer Science ; ISSN 0302-9743], Springer International Publishing, Cham, pp. 325-335, XP047554326, ISBN: 978-3-030-58594-5.

International Search Report and Written Opinion for International Application No. PCT/US2021/063295, dated Mar. 17, 2022 (Mar. 17, 2022)—13 pages.

Chatain, Julia et al., "DigiGlo: Exploring the Palm as an Input and Display Mechanism through Digital Gloves," Association for Computing Machinery, CHI Play '20, Nov. 2-4, 2020, Virtual Event, Canada, 12 pages.

International Search Report and Written Opinion for International Application No. PCT/US2022/023608, dated Jul. 11, 2022 (Jul. 11, 2022)—12 pages.

International Search Report and Written Opinion for International Application No. PCT/US2022/024565, dated Jul. 25, 2022 (Jul. 25, 2022)—15 pages.

U.S. Appl. No. 17/589,065, filed Jan. 31, 2022 to Stolzenberg.

U.S. Appl. No. 17/714,352, filed Apr. 6, 2022 to Hwang et al.

U.S. Appl. No. 17/719,654, filed Apr. 13, 2022 to Hwang et al.

Google Atap: "Welcome to Project Soli", published May 29, 2015, XP055903745, Retrieved from the Internet: URL: https://www.youtube.com/watch?v=OQNiZf SsPc0&t=61s [retrieved on Mar. 21, 2022].

International Search Report and Written Opinion for International Application No. PCT/US2021/063340, dated Apr. 4, 2022 (May 4, 2022)—10 pages.

Song, Chen, "Sensor Fusion for Learning-based Tracking of Controller Movement in Virtual Reality". Sep. 2019, IEEE, pp. 1-5. (Year: 2019).

U.S. Appl. No. 16/865,995, filed May 4, 2020 to Canberk, et al.

U.S. Appl. No. 17/588,934, filed Jan. 31, 2022 to Stolzenberg, et al.

* cited by examiner

TRACKING HAND GESTURES FOR INTERACTIVE GAME CONTROL IN AUGMENTED REALITY

TECHNICAL FIELD

Examples set forth in the present disclosure relate to the field of augmented reality (AR) and wearable electronic devices such as eyewear. More particularly, but not by way of limitation, the present disclosure describes the real-time tracking of hand gestures and the display of virtual objects in augmented reality.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Augmented reality (AR) combines real objects in a physical environment with virtual objects and displays the combination to a user. The combined display gives the impression that the virtual objects are authentically present in the environment, especially when the virtual objects appear and behave like the real objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
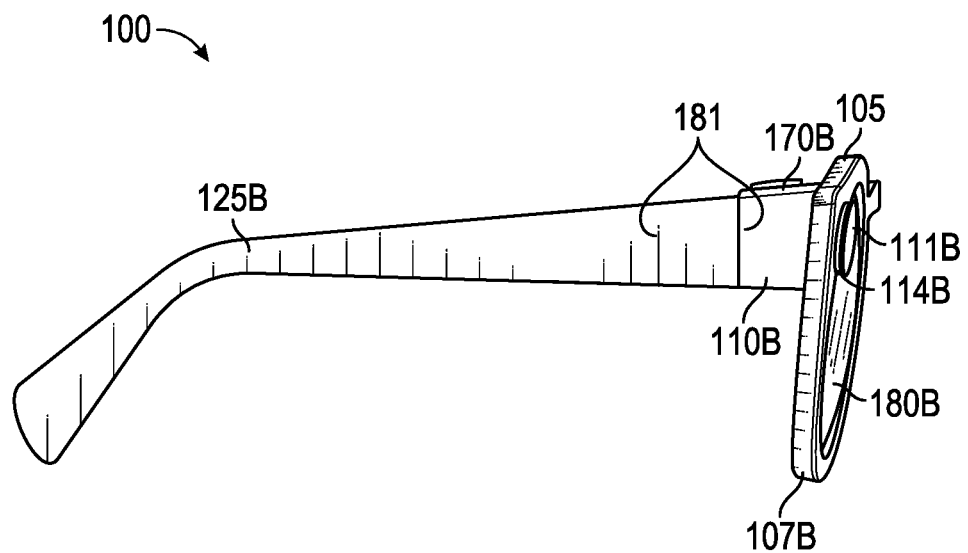
FIG. 1A is a side view (right) of an example hardware configuration of an eyewear device suitable for use in a game control system.

Various implementations and details are described with reference to example interactive games presented in augmented reality on the display of an electronic eyewear device. The eyewear device includes a camera, a processor, a memory, a hand tracking utility, and a display. The camera is configured to capture frames of video data, wherein each frame of video data includes depth information for a plurality of pixels. A game application stored in memory on the eyewear, in one example, interactive game, is configured to present a game clock on said display at a location establishing a field of play. The field of play is persistently viewable as an overlay relative to the surrounding physical environment, independent of movement of the eyewear. The game clock is configured to increment from a start time to a final time. Using the hand tracking utility, the game application detects in the frames of video data a final hand shape associated with a final time on the game clock. The game application presents on the display a final virtual game piece based on the detected final hand shape. The final virtual game piece is broadcast wirelessly to nearby devices, including an opponent device. The game application detects an opposing final virtual game piece, which may or may not be presented on the user's display. The game application presents on the display a game score based on the final virtual game piece versus the opposing final virtual game piece.

In a related example interactive game, the game application presents a key image at a scoring location on the display. The game application presents an icon that appears to move from a distal location toward the key image. Using the hand tracking utility, the game application detects in the frames of video data a final hand shape—and a final hand location— associated with a final time on the game clock. The final time is associated with the apparent collision between the moving icon and the key image. At the final time when the apparent collision occurs, the game application determines (a) whether the detected final hand location is a location match relative to the apparent collision, and (b) whether the detected final hand shape is a shape match relative to the key image. If both conditions are satisfied, the game application increases the game score incrementally.

Although the various systems and methods are described herein with reference to presenting an interactive game, the technology described may be applied to guide the manipulation of other kinds of objects or instruments, such as handheld surgical devices, hand tools, parts to be assembled, input components like keyboards and keypads, and the like.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to generate a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at an instant in time. The term "gesture" refers to the active movement of an object, such as a hand, through a series of poses, sometimes in rapid succession (e.g., waving, pinching) to convey a signal or idea. The terms "pose" and "gesture" are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
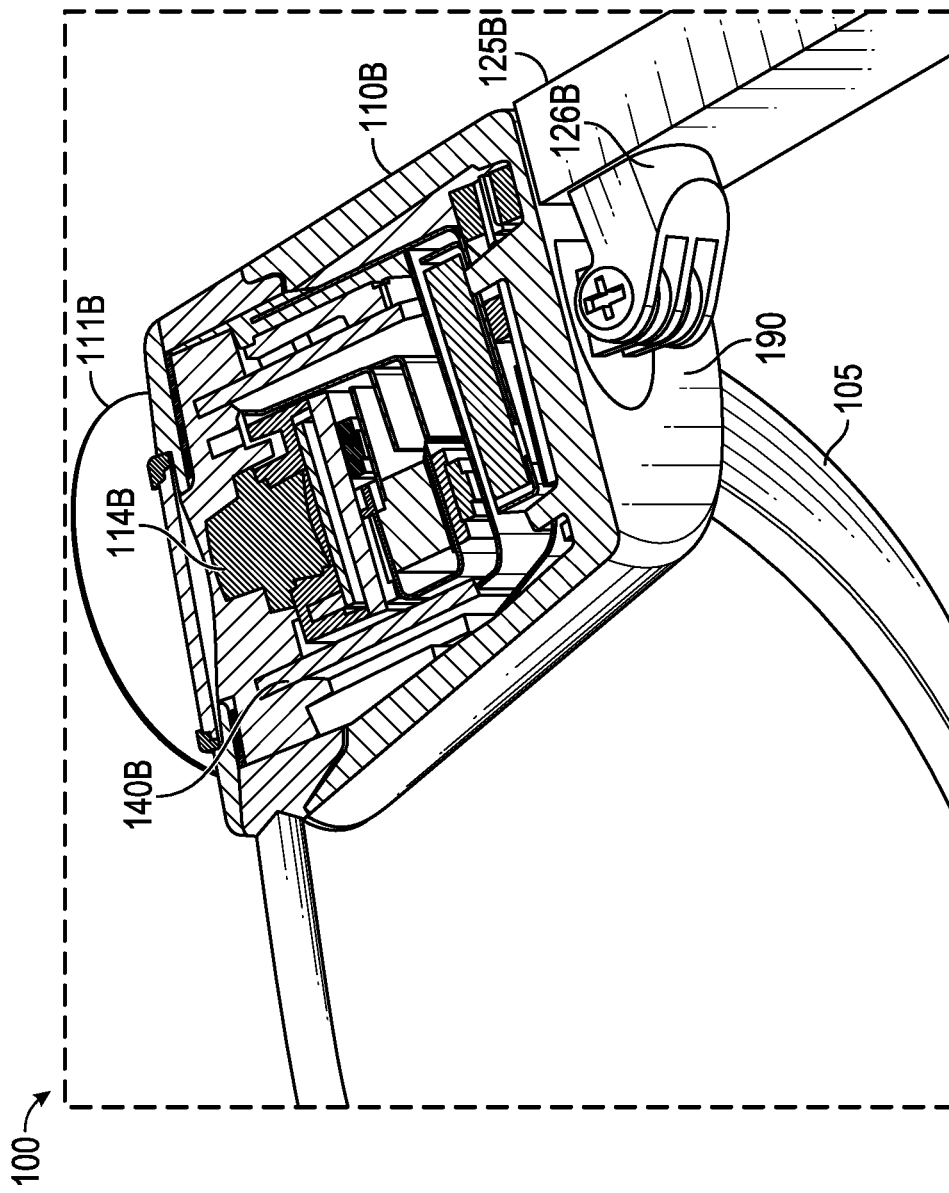
FIG. 1B is a perspective, partly sectional view of a right corner of the eyewear device of FIG. 1A depicting a right visible-light camera, and a circuit board.
Figure 1C:
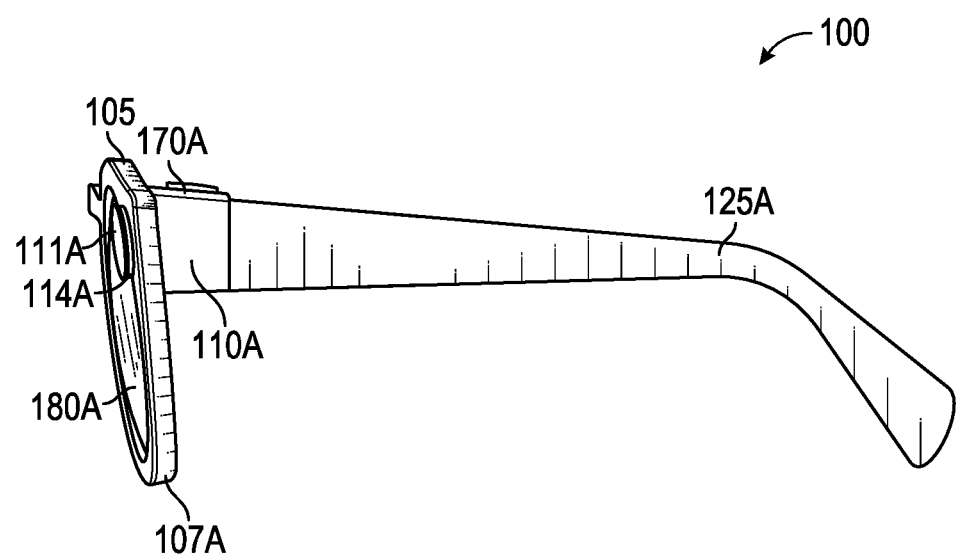
FIG. 1C is a side view (left) of an example hardware configuration of the eyewear device of FIG. 1A, which shows a left visible-light camera.
Figure 1D:
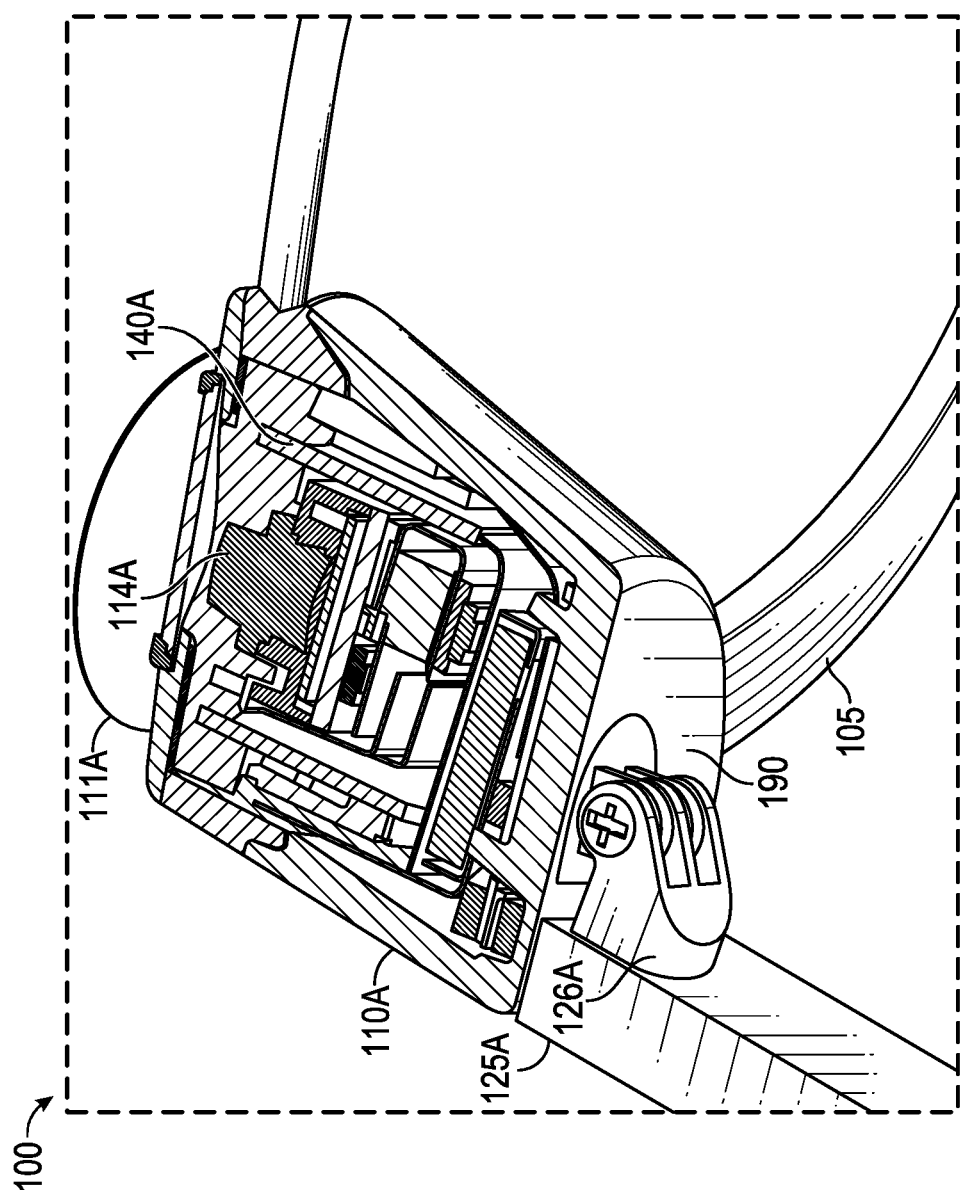
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
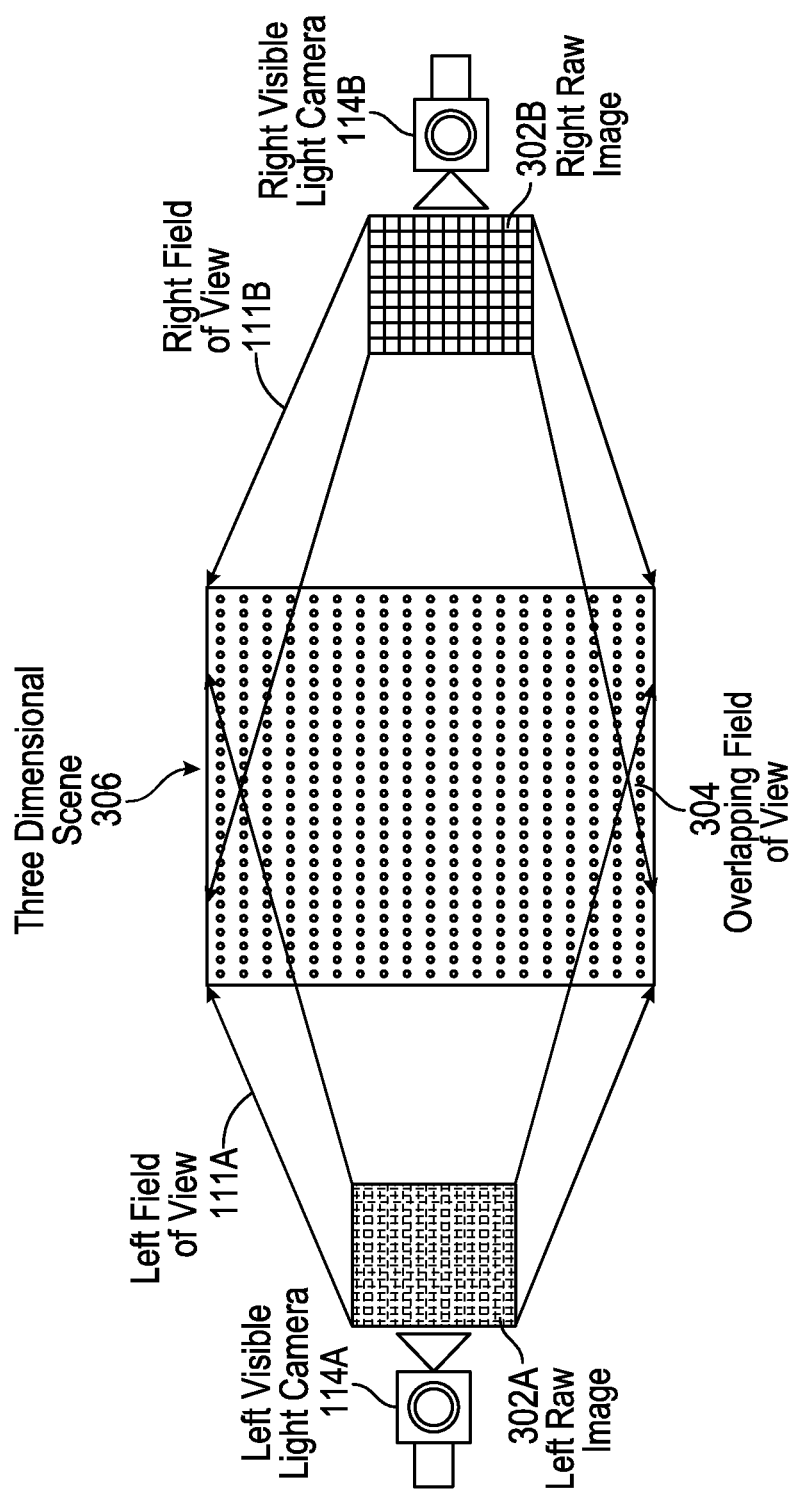
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640 p (e.g., 640×480 pixels for a total of 0.3 megapixels), 720 p, or 1080 p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126A connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
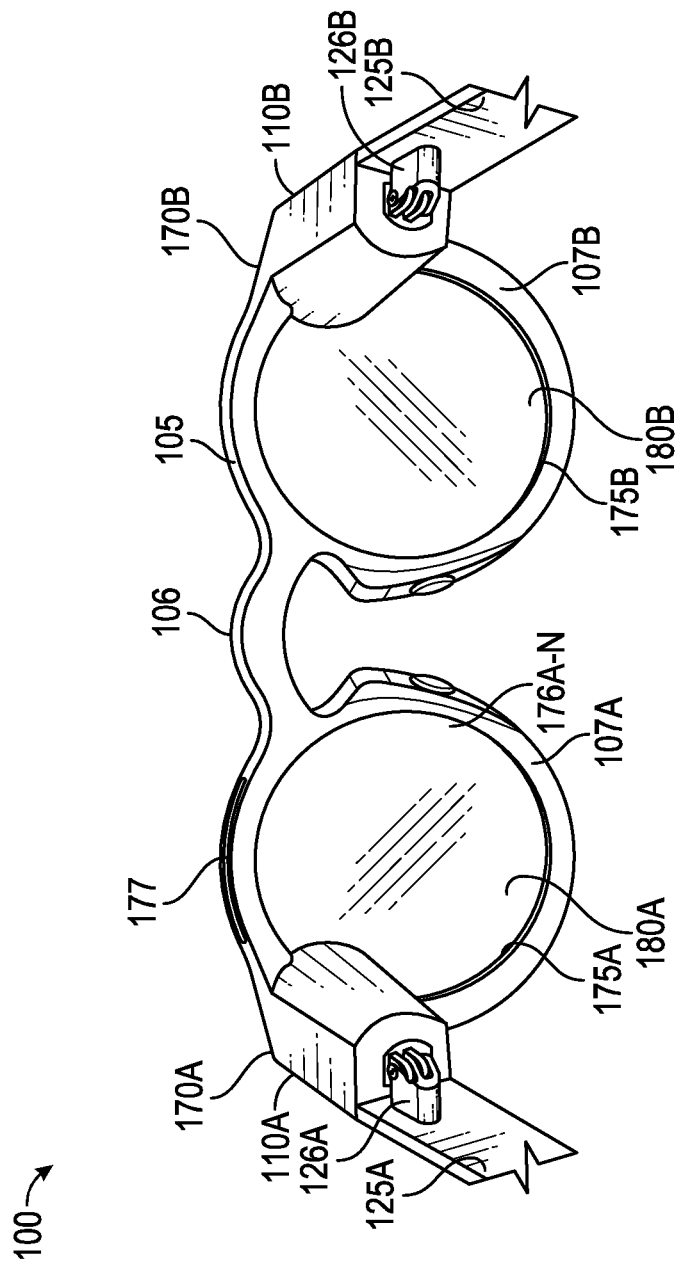
FIGS. 2A and 2B are rear views of example hardware configurations of an eyewear device utilized in the game control system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
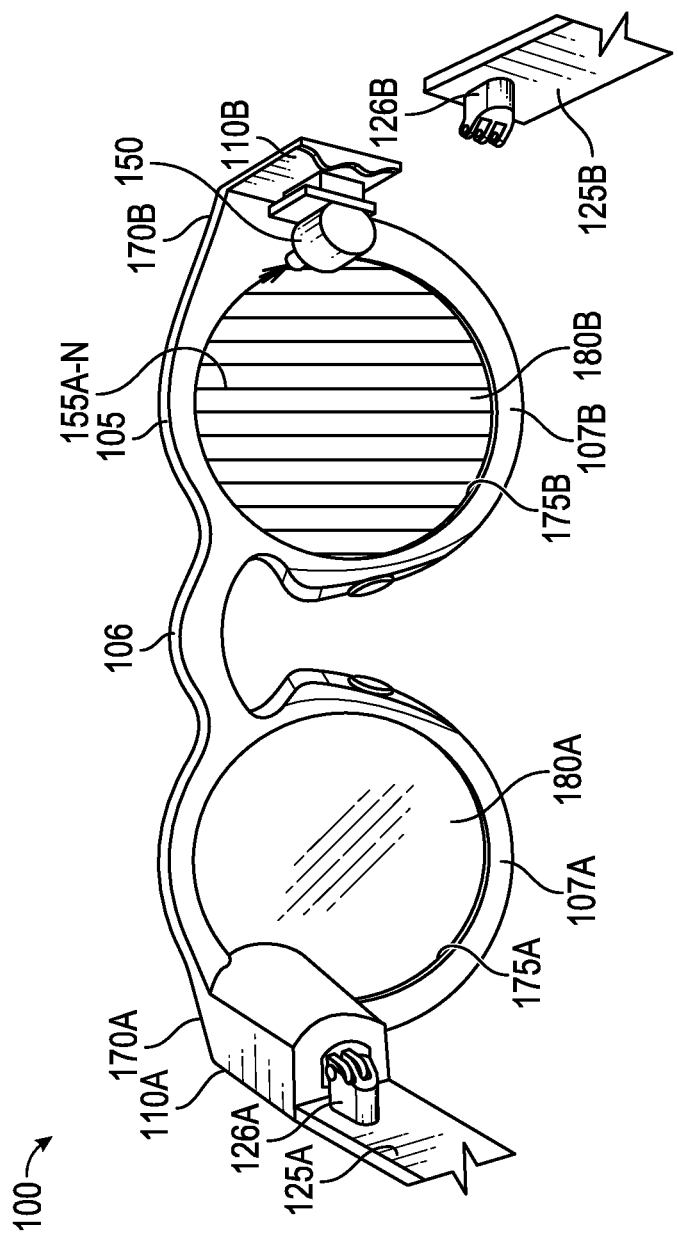

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, ... 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a time-stamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the game control system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
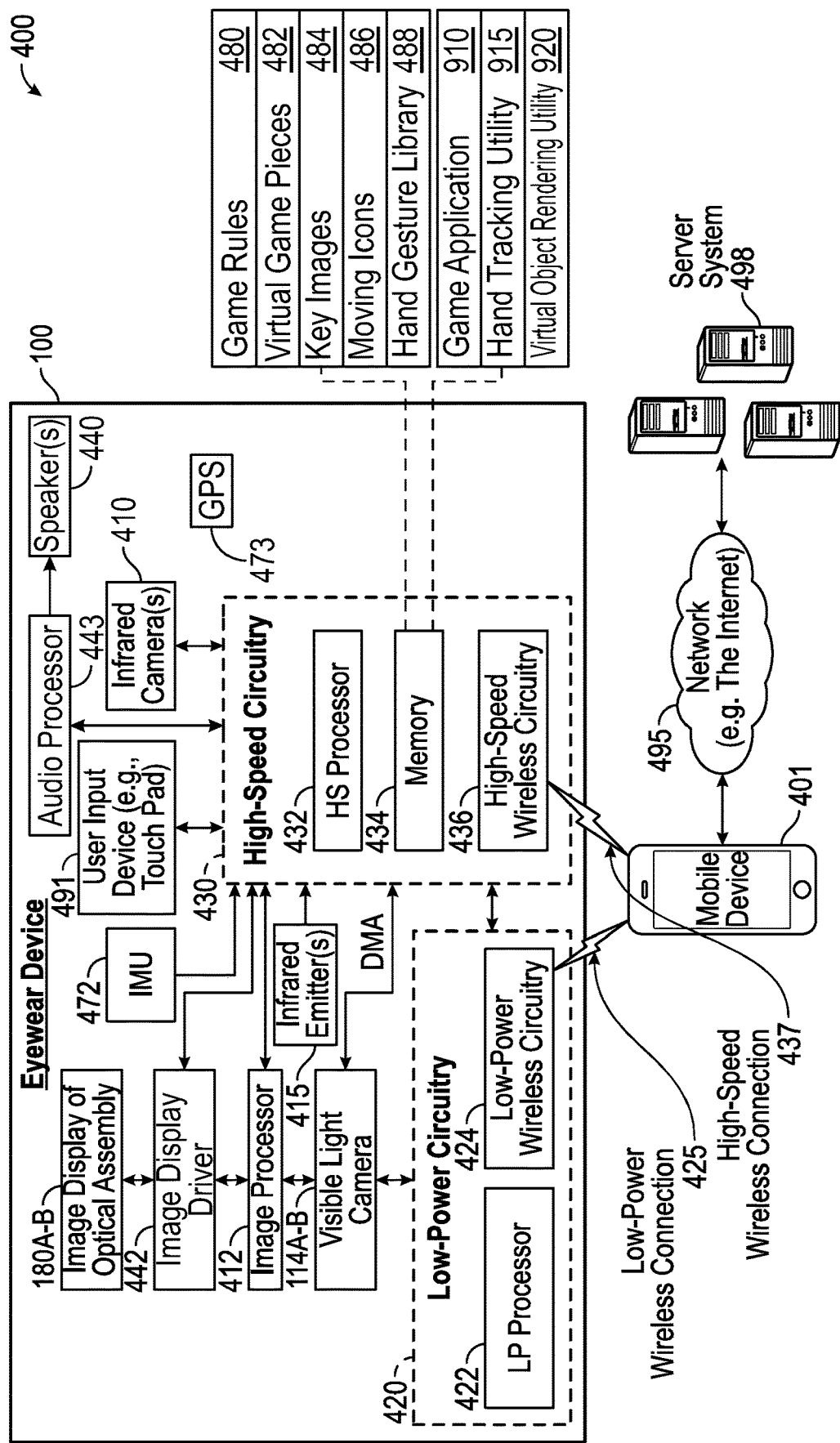
FIG. 4 is a functional block diagram of an example game control system including a wearable device (e.g., an eyewear device) and a server system connected via various networks.

FIG. 4 is a functional block diagram of an example game control system 400 that includes a wearable device (e.g., an eyewear device 100), a mobile device 401, and a server system 498 connected via various networks 495 such as the Internet. The game control system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
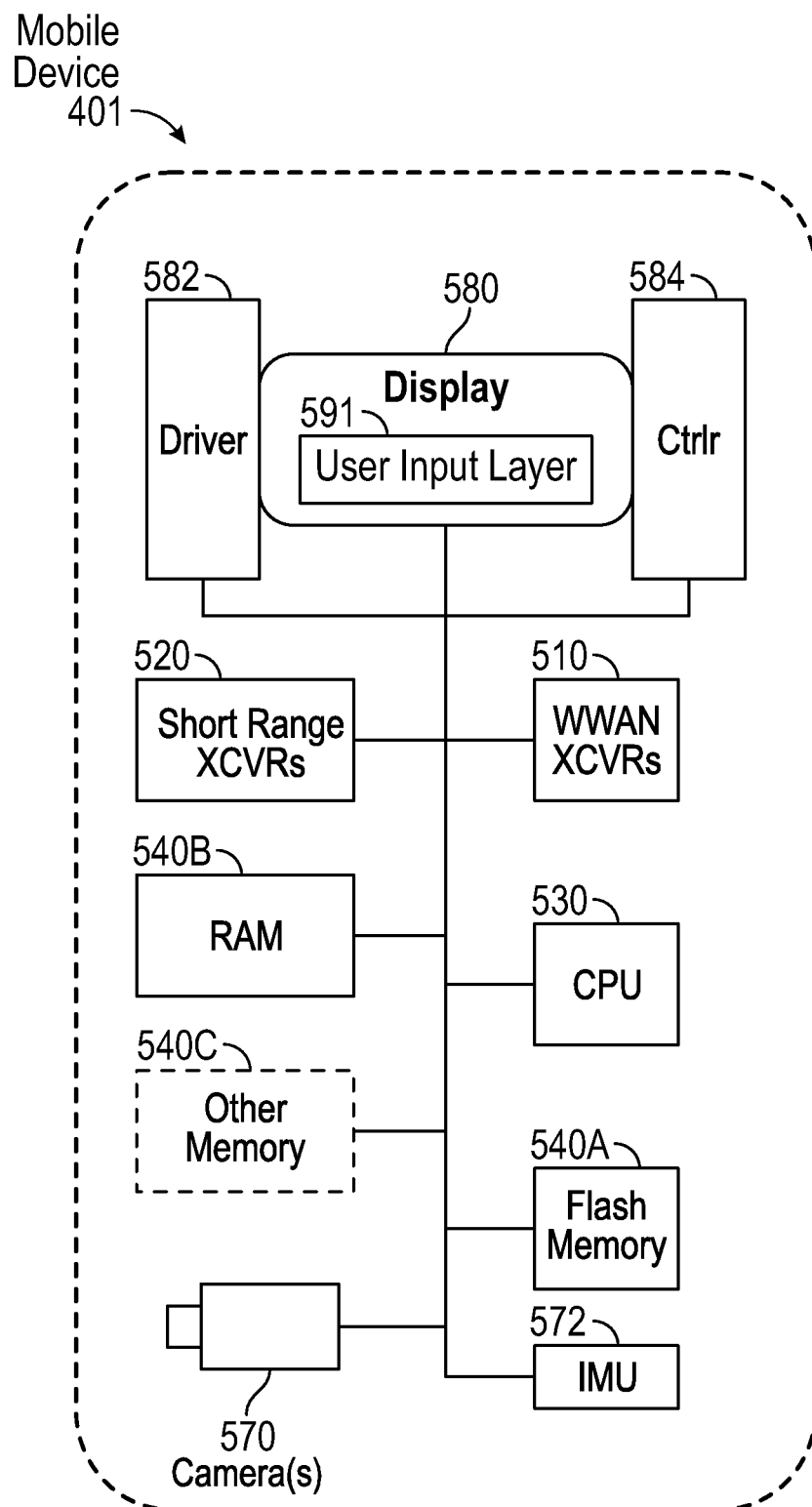
FIG. 5 is a diagrammatic representation of an example hardware configuration for a mobile device of the game control system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The game control system 400, as shown in FIG. 4, includes a computing device, such as mobile device 401, coupled to an eyewear device 100 over a network. The game control system 400 includes a memory for storing instructions and a processor for executing the instructions. Execution of the instructions of the game control system 400 by the processor 432 configures the eyewear device 100 to cooperate with the mobile device 401. The game control system 400 may utilize the memory 434 of the eyewear device 100 or the memory elements 540A, 540B, 540C of the mobile device 401 (FIG. 5). Also, the game control system 400 may utilize the processor elements 432, 422 of the eyewear device 100 or the central processing unit (CPU) 530 of the mobile device 401 (FIG. 5). In addition, the game control system 400 may further utilize the memory and processor elements of the server system 498. In this aspect, the memory and processing functions of the game control system 400 can be shared or distributed across the eyewear device 100, the mobile device 401, and the server system 498.

The memory 434, in some example implementations, includes or is coupled to game rules 480, a set of virtual game pieces 482, key images 484, icons 486, and a hand gesture library 488. The game rules 480 include a series of rules for conducting a game, presenting game pieces, and scoring the results. The virtual game pieces 482 include one or more virtual objects selected from a virtual object library or database. The virtual game pieces 482 are designed to represent a three-dimensional game piece when rendered and presented on a display. The key images 484, as described herein, may correspond to one of the virtual game pieces 482. The icons 486 are correlated with the key images 484 and, as described herein, are sized and shaped to appear to move along a virtual scroll.

The library of hand gestures 488 includes a large number of poses and gestures, with the hand in various positions and orientations. The stored poses and gestures are suitable for ready comparison to a hand shape that is detected in an image. The library 488 includes three-dimensional coordinates for a large number of landmarks, from the wrist to the fingertips. For example, a hand gesture record stored in the library 488 may include a hand gesture identifier (e.g., closed fist, open palm, relaxed hand, grasping an object, pinching, spreading), a point of view or a directional reference (e.g., palmar side visible, dorsal, lateral), and other information about orientation, along with three-dimensional coordinates for the wrist, the fifteen interphalangeal joints, the five fingertips and other skeletal or soft-tissue landmarks. The process of selecting a candidate hand gesture from the library 488 involves comparing the detected hand shape to each hand gesture stored in the library 488 until a good match is found.

The memory 434 additionally includes, for execution by the processor 432, a game application 910, a hand tracking utility 915, and a virtual object rendering utility 920. The game application 910, as described herein, includes instructions for conducting a game or task, for presenting elements on a display, for communicating with other devices, and for scoring the game or task. The hand tracking utility 915 configures the processor 432 to detect hand shapes in still images or frames of video footage and to track the motion of hand shapes in subsequent frames. The virtual object rendering utility 920 configures the processor 432 to render virtual objects, such as virtual game pieces 482, for presenting on a display, such as one or both optical assemblies 180A, 180B under control of the image display driver 442 and the image processor 412.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit 473, or a combination of two or more of such sensor data, or from other sensors providing data useful in determining positional information.

Figure 6:
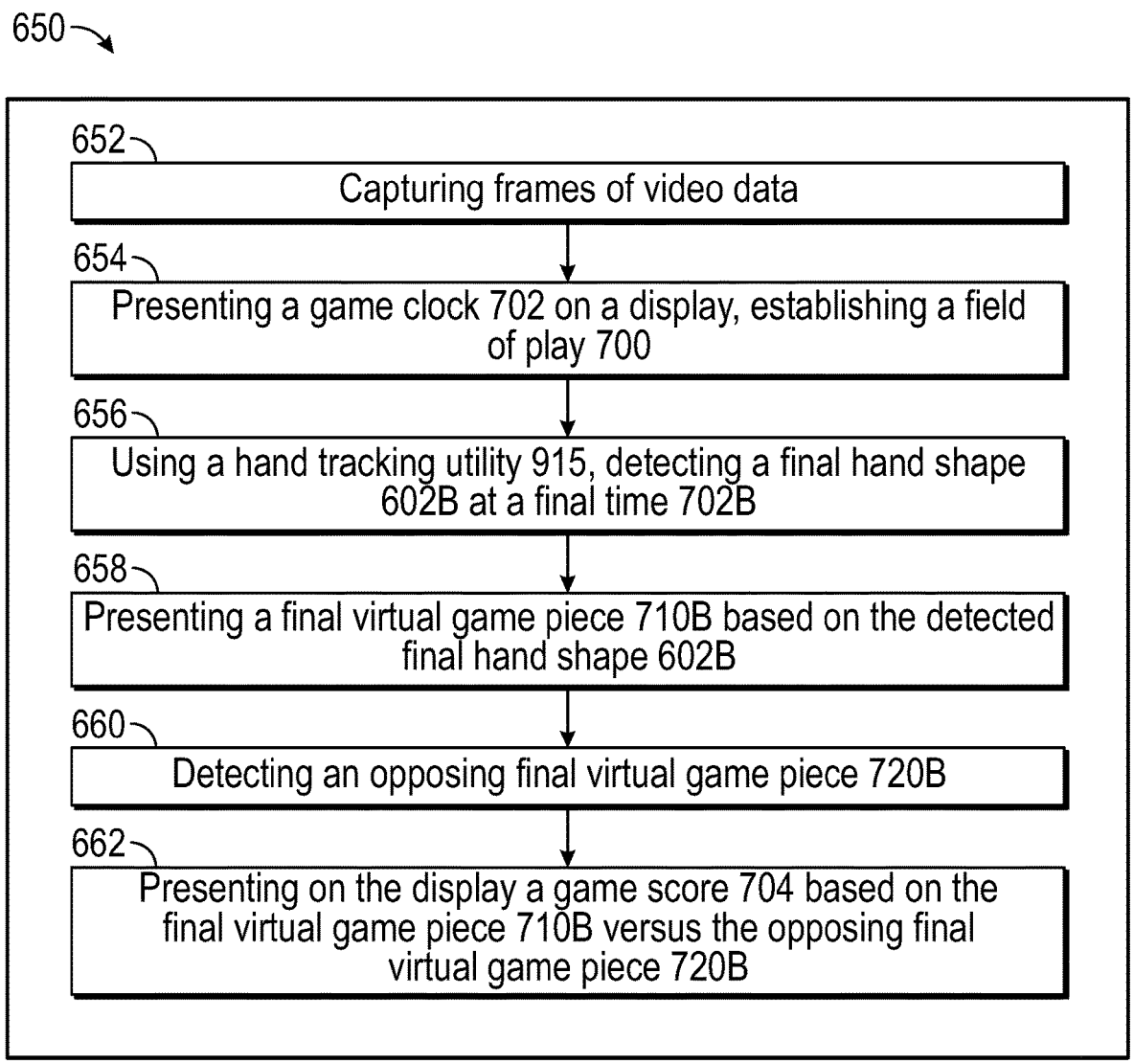
FIG. 6 is a flow chart listing the steps in an example method of presenting an interactive game in augmented reality.

FIG. 6 is a flow chart 650 listing the steps in an example method of presenting an interactive game in augmented reality. Although the steps are described with reference to the eyewear device 100, as described herein, other implementations of the steps described, for other types of wearable mobile devices, will be understood by one of skill in the art from the description herein. Additionally, it is contemplated that one or more of the steps shown in the drawings, and described herein, may be omitted, repeated, performed simultaneously or in a series, performed in an order other than illustrated and described, or performed in conjunction with additional steps.

The steps are described with reference to an eyewear device 100 that includes a processor 432, memory 434, a hand tracking utility 915, and a display 180A, 180B. Consistent with aspects of some example implementations, the eyewear device 100 initiates and runs a game application 910, the hand tracking utility 915, and a virtual object rendering utility 920. The game application 910 includes programming directing the eyewear processor to execute the steps described in the flow chart 650, accessing the hand tracking utility 915 and the virtual object rendering utility 920 as needed for particular tasks.

At block 652, the processor 432 captures frames of video data with a camera 114A, 114B that is coupled to or part of an eyewear device 100. The camera 114A, 114B, in some implementations, includes one or more high-resolution, digital cameras equipped with a CMOS image sensor capable of capturing high-definition still images and high-definition video. Each frame of digital video includes depth information for a plurality of pixels in the image. In this aspect, the camera 114A, 114B serves as a high-definition scanner by capturing a detailed input image of the environment. The camera 114A, 114B, in some implementations, includes a pair of high-resolution digital cameras 114A, 114B coupled to the eyewear device 100 and spaced apart to acquire a left-camera raw image and a right-camera raw image. When combined, the raw images form an input image that includes a matrix of three-dimensional pixel locations. The method, at step 802, in some implementations, includes storing the captured sequences of frames of video data in memory 434 on the eyewear device 100, at least temporarily, such that the frames are available for analysis; for example, to detect hand shapes and track their movement.

At block 654, the processor 432 presents a game clock 702 on a display of the eyewear device 100. The game clock 702, in some implementations, is presented at a location on the display which establishes a field of play 700 for an interactive game. The image processor 412 and image display driver 442 are involved in presenting the game clock 702 on the display, which, in this example, is one or both of the optical assemblies 180A, 180B of the eyewear device 100). In one example implementation, the right lens (right optical assembly 180B) includes a right display matrix 177B configured to interact with light from a right projector 150B positioned to project images onto the interior surface of the lens 180B.

Figure 7A:
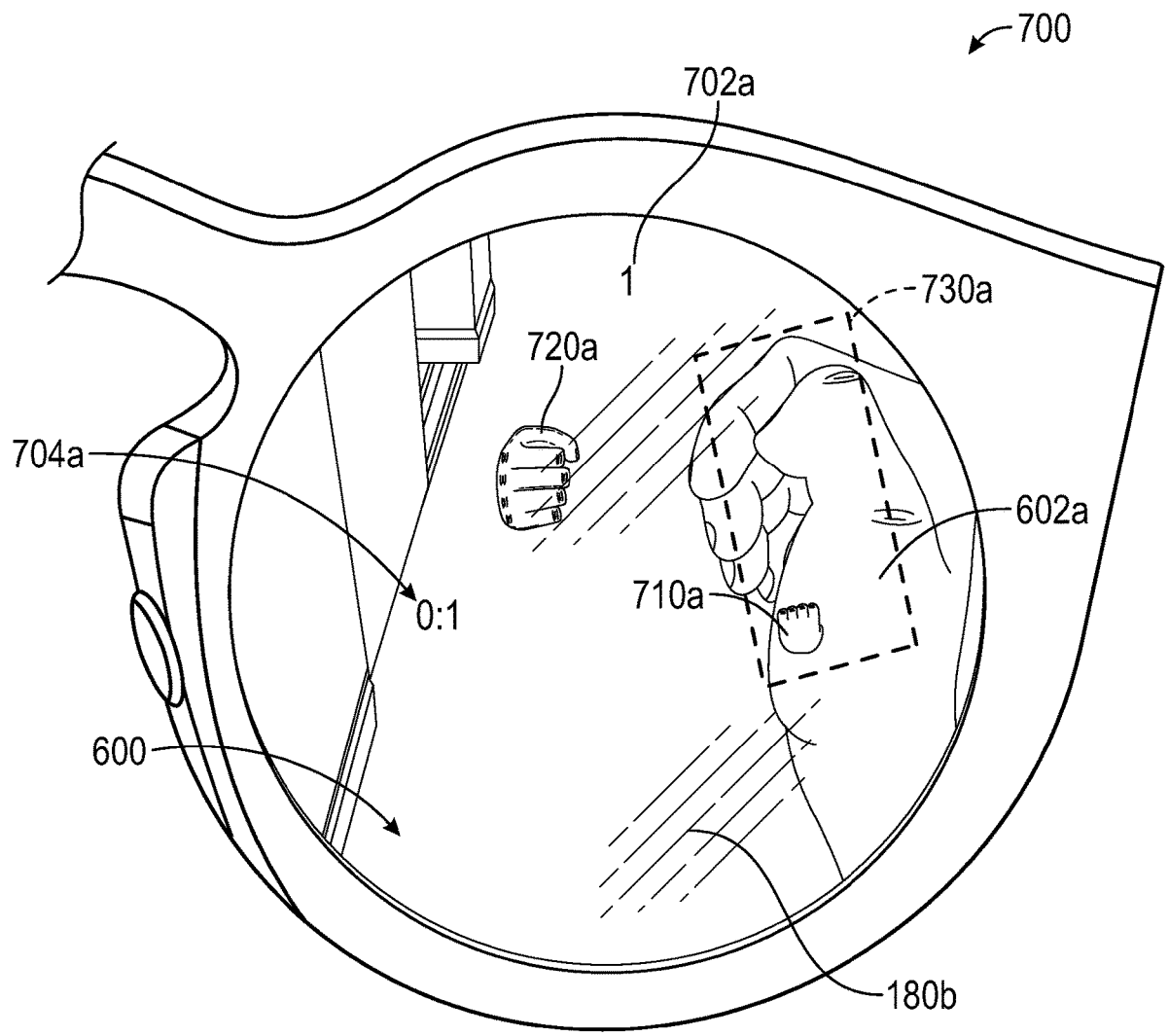
FIG. 7A is a perspective illustration of an example interactive game, at a preliminary time, presented on a display in augmented reality.

As shown in FIG. 7A, a game clock showing a preliminary time 702a is presented at an upper, central location on the display 180A, 180B. The game clock 702, the game score 704, and the virtual game pieces 710, 720 as described herein remain persistently viewable on the display as an overlay relative to the physical environment 600. In other words, those elements of the field of play 700 do not move, relative to the display, regardless of movements of the eyewear 100 or the user's hand 602. The game clock 702 is configured to increment from a start time 702a, when play begins, to a final time 702b, when the final virtual game pieces 710b, 720b are evaluated to determine a game score 704.

Figure 7B:
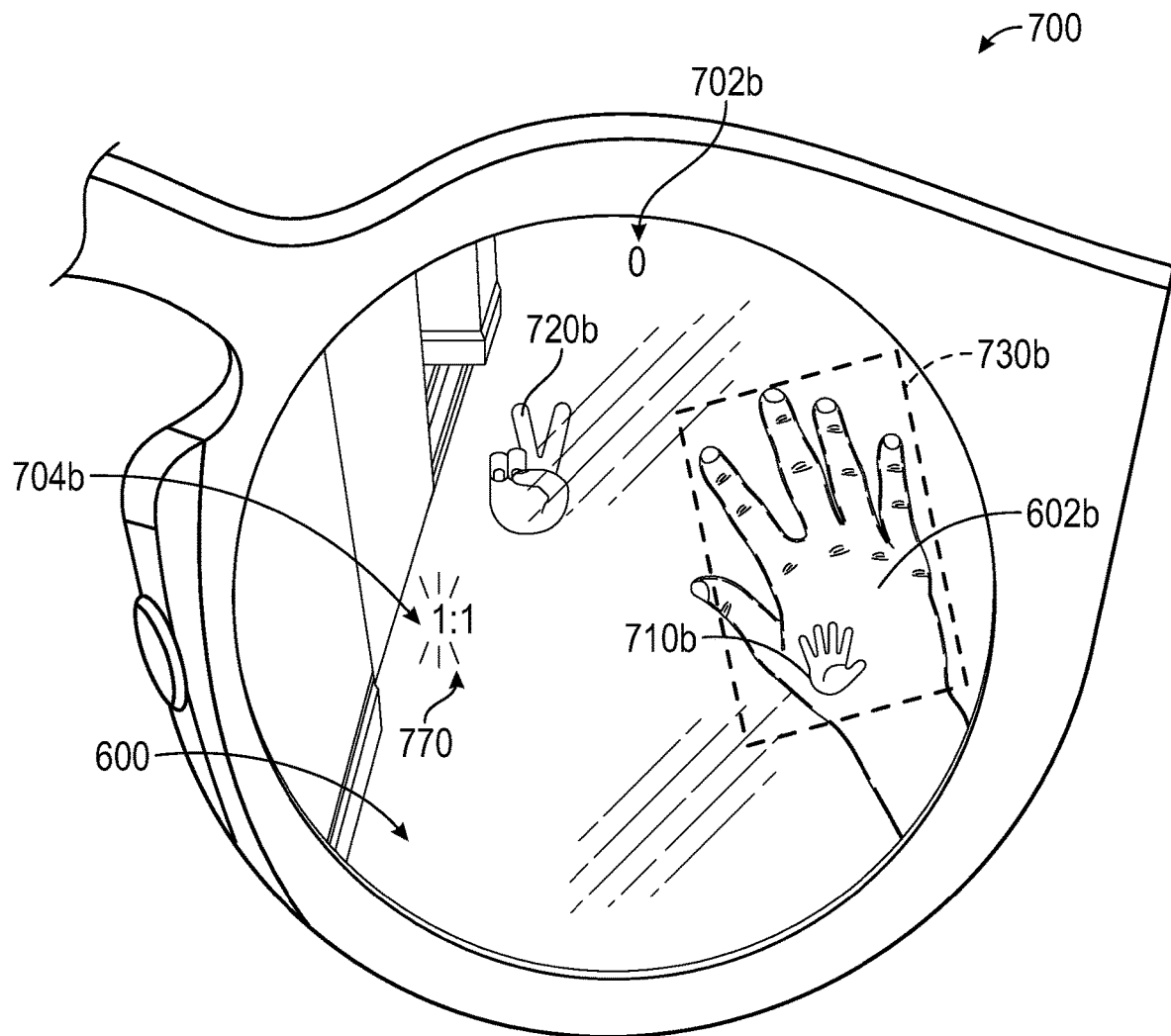
FIG. 7B is a perspective illustration of the example interactive game of FIG. 7A, at a final time, presented on a display in augmented reality.

At block 656, the processor 432, using a hand tracking utility 915, analyzes the frames of video and detects a final hand shape 602b associated with the final time 702b on the game clock 702. The hand tracking utility 915 may detect one or more preliminary hand shapes, as described herein; however, the final hand shape 602b, detected at or near the final time 702b, is most useful in determining the game score 704. The detection need not take place precisely at the final time 702b. As shown in FIG. 7B, the final time 702b is zero and the final hand shape 602b is a flat or open hand, as shown, with the fingers extended.

At block 656, the processor 432 presents on the display a final virtual game piece 710b, which is based on the detected final hand shape 602b. Presenting the final virtual game piece 710b, in some implementations, involves the virtual object rendering utility 920 described herein. As shown in FIG. 7B, the final virtual game piece 710b is an image of an open hand, which corresponds with or matches the detected final hand shape 602b (an open hand). As described herein, the process of selecting a final virtual game piece 710b that matches the detected final hand shape 602b, in some implementations, includes generating a bounding box 730b around the hand shape, identifying hand landmarks, selecting a candidate hand gesture from a library of hand gestures, and selecting a virtual game piece based on the selected hand gesture.

At block 660, the processor 432 detects an opposing final virtual game piece 720b which, in this example interactive game, was detected by an opponent device and presented on an opponent display (which, from the opponent's perspective, is her final virtual game piece 710b). In this aspect, the method contemplates a user eyewear device 100 and an opponent running the game application 910 on a similar eyewear device. For scoring purposes, however, the game application 910 need only detect the opposing final virtual game piece 720b, which may be presented on the display in the field of play 700, as shown in FIG. 7B. In order to be detected, the opposing final virtual game piece 720b may be broadcast by the opponent device. In this aspect, the processor(s) 432 may be configured to broadcast wirelessly the final virtual game pieces 730b, 720b from their respective devices to nearby devices.

At block 662, the processor 432 presents on the display a game score 704 that is based on the final virtual game piece 710b versus the opposing final virtual game piece 720b. Calculating the score includes comparing the values associated with each game piece 710, 720b.

Example implementations of the present disclosure are directed toward a game application 910 and method for presenting an interactive game modeled after the game known as Rock Paper Scissors. Presenting a game score 704 in this example includes applying the game rules 480 associated with Rock Paper Scissors; namely, Rock beats Scissors, Scissors beats Paper, Paper beats Rock, and throwing the same element (e.g., Rock versus Rock) results in a draw. The game rules 480 may include a value associated with a winning score, such as three. Because any turn may result in a tie or draw, it may take any number of turns before a player achieves the winning score.

FIG. 7A is a perspective illustration of an example interactive game of Rock Paper Scissors, at a preliminary time, presented in augmented reality. The field of play 700 is presented on the display 180B as an overlay relative to the physical environment 600. The field of play 700 includes a preliminary game score 704a and a game clock showing a preliminary time 702a. The preliminary time 702a represents any time before (or after) the final time, when a score is determined.

At this preliminary stage of the game, a camera coupled to the eyewear device is capturing frames of video data. The hand tracking utility 915, as described herein, detects a preliminary hand shape 602a (i.e., the user's own hand, in the shape of a fist, detected within the field of view of the camera and the eyewear). Based on the detected preliminary hand shape 602a, the game application 910 retrieves and presents on the display a corresponding preliminary virtual game piece 710a, which in this example is an icon in the shape of a fist, as shown. The bounding box 730a, as described herein, is shown here for reference purposes, and may or may not be presented on the display to the user.

The opponent's hand, in this example, is not viewable within the field of view of the camera and the eyewear. In operation, when an opponent device is running the game application 910, the opponent device will detect the opponent's preliminary hand shape, select a corresponding preliminary virtual game piece, and then broadcast the preliminary virtual game piece to nearby devices, such as the eyewear 100 worn by the user. Once received, the user's game application 910 presents on the display the opponent's preliminary virtual game piece 720a, as shown, which in this example is also an icon in the shape of a fist. As shown, the opponent's preliminary virtual game piece 720a is presented at a location that is spaced apart from the user's own preliminary virtual game piece 710a.

Because the camera is continuously capturing frames of video data, the preliminary virtual game pieces 710a will update in response to any change in the detected preliminary hand shape 602*a*. Similarly, the opponent's device will update the opponent's preliminary virtual game piece 720*a* in response to any change in the opponent's preliminary hand shape. In this aspect, the preliminary virtual game pieces 710*a*, 720*a* may be updated at any time.

The game clock may be configured, in accordance with the game rules 480, to increment the time in seconds or other interval, and in either direction (increasing or decreasing), from a start time to a final time. For example, the final time 702*b* shown in FIG. 7B is zero, displayed after a countdown from a start time, such as three. In FIG. 7A the preliminary time 702*a* is one.

The game application 100, in some implementations, is configured to synchronize the game clock on the user's device with the game clock on the opponent's device, such that the game clock is presented and incremented on the display simultaneously on both devices. To start the game, and to start a next turn in the game, the game application 100, in some implementations, is configured to start the game clock at the start time on both displays in response to detecting a start signal in the captured frames of video data. The start signal, in one example, includes the detection and display of both preliminary virtual game pieces 710*a*, 720*a* on both displays, whether matching one another as shown in FIG. 7A or not. The start signal, in another example, includes the detection and display of a specific preliminary virtual game piece, such as a two-finger horns-like game piece (e.g., third icon 843*b* and third key image 863*b*, shown in FIG. 8B).

FIG. 7B is a perspective illustration of the example interactive game of FIG. 7A, at a final time, presented in augmented reality. The field of play 700, as shown, includes an updated game score 704*b* and a game clock showing a final time 702*b*. The final time 702*b* represents the instant when a game score is determined. The final hand shapes, however, need not be detected precisely at the instant of time represented by the final time 702*b*; however, the game application 910 in accordance with the game rules 480 may proscribe a discrete window of time during which the final hand shapes are detected. In this aspect, the hand shape detected nearest in time to the final time 702*b* will be considered the final hand shape 602*b* and will be used when retrieving and presenting a corresponding final virtual game piece 710*b*.

At the final time 702*b*, the hand tracking utility 915, as described herein, detects a final hand shape 602*b* (i.e., the user's own hand, in the shape of an open hand). Based on the final hand shape 602*b*, the game application 910 retrieves and presents on the display a corresponding final virtual game piece 710*b*, which in this example is an icon in the shape of an open hand, as shown. The bounding box 730*b* around the final hand shape 602*b*, as described herein, is shown here for reference purposes, and may or may not be presented on the display to the user.

In operation, the opponent device will detect the opponent's preliminary hand shape, select a corresponding preliminary virtual game piece, and then broadcast the preliminary virtual game piece to nearby devices, such as the eyewear 100 worn by the user. Once received, the user's game application 910 presents on the display the opponent's final virtual game piece 720*b*, as shown, which in this example is an icon in the shape of a two-fingered vee (also known as a peace sign or victory sign). As shown, the opponent's final virtual game piece 720*b* is presented at a location that is spaced apart from the user's own final virtual game piece 710*b*.

In the example shown in FIG. 7B, at the final time 702*b*, the user's final game piece 710*b* is an open hand, as shown, representing Paper, and the opponent's final virtual game piece 720*b* is a two-finger vee or peace sign, as shown, representing Scissors. The updated game score 704*b* illustrates an incremental increase by one, for the opponent, on the left side of the colon (indicating a win because Scissors beats Paper), along with a highlight 770 that, in some examples, appears near the winning score for a predetermined duration.

The next turn in the game may start after a pause lasting a predetermined duration or in response to a start signal. The game application 910, in accordance with the game rules 640, may include a setting for the pause duration that is adjustable through a user interface. Upon starting the next turn, the game clock will initiate, of course, at a new or subsequent start time on both displays. After one player achieves a winning score, such as three, the game application 910 may be configured to start a new game, either in response to detecting a start signal or automatically (after a pause or immediately).

Figure 8A:
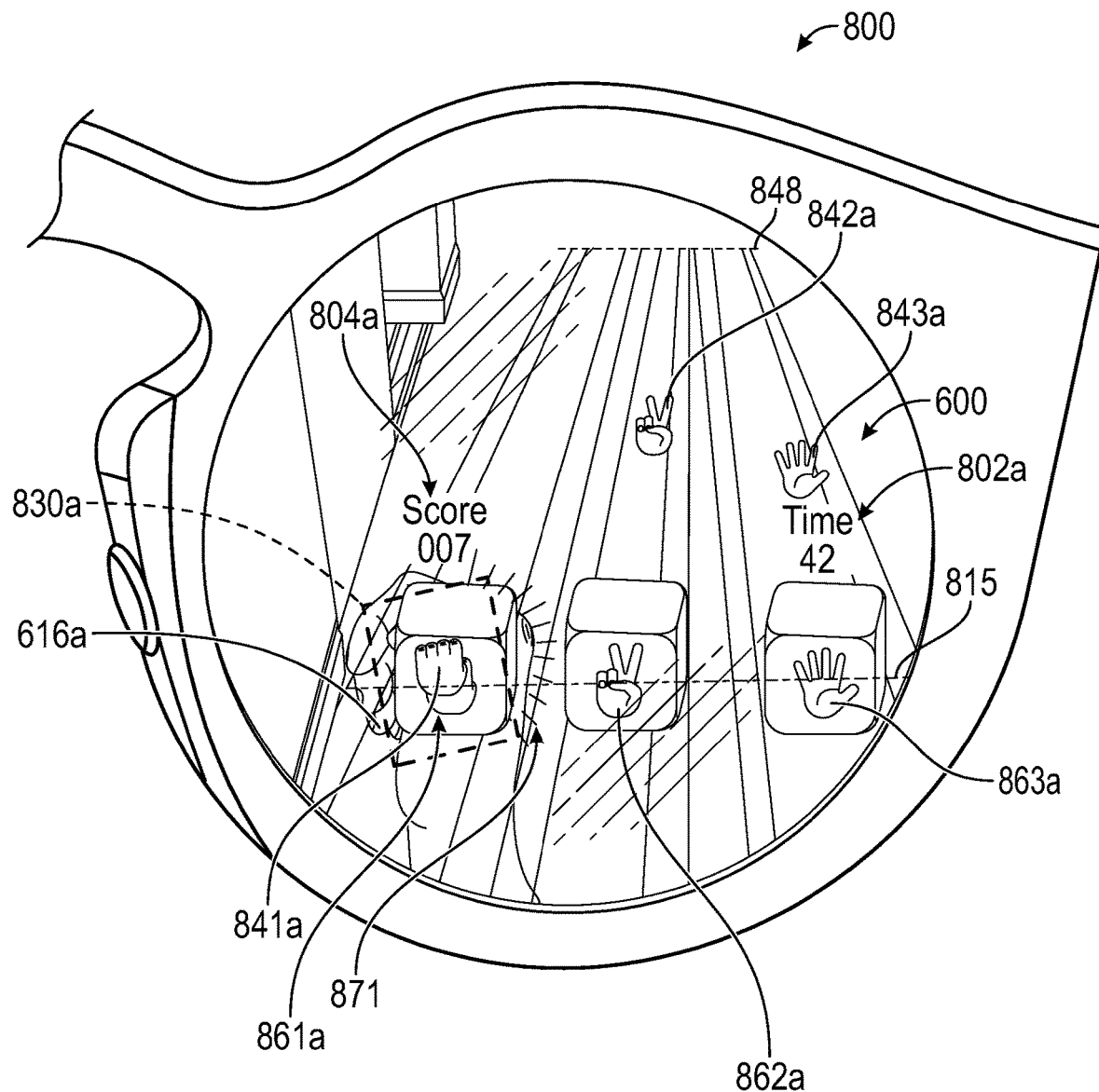
FIGS. 8A and 8B are perspective illustrations of a second example interactive game, presented on a display in augmented reality.
Figure 8B:
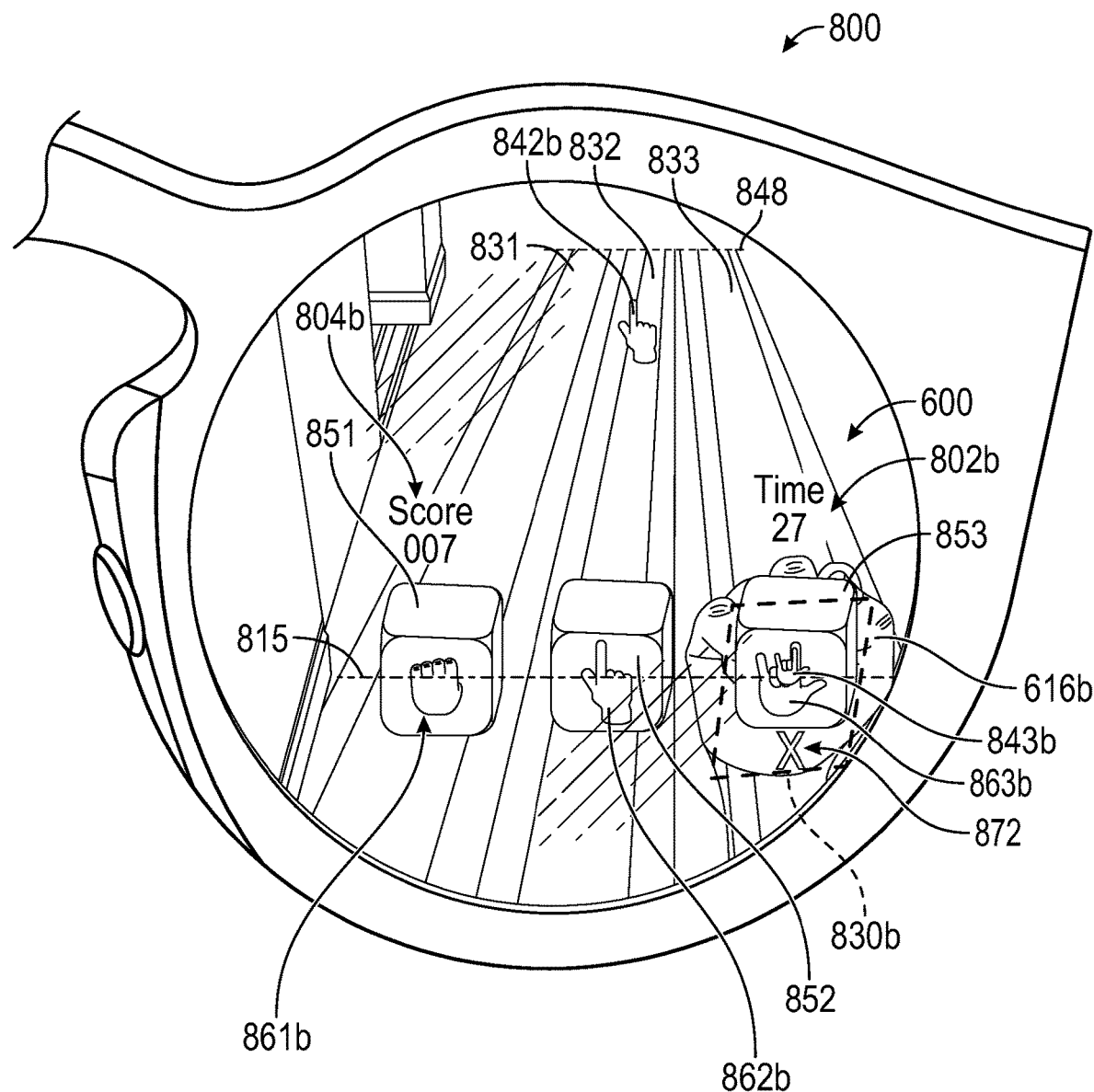

FIGS. 8A and 8B are perspective illustrations of a second example interactive game, presented in augmented reality.

Consistent with the example shown in FIG. 8A, the field of play 800 includes a game clock showing a first time 802*a*, a game score showing a first score 804*a*, a group of three key images 861*a*, 862*a*, 863*a*, and a group of three lanes 831, 832, 833 (labeled in FIG. 8B) which appear to extend from a distal location 848 toward the key images. The field of play 800 is persistently viewable on the display as an overlay relative to the physical environment 600. In other words, the elements presented on the field of play 800 do not move, relative to the display, regardless of movements of the eyewear 100 or the user's hand.

The three key images 861*a*, 862*a*, 863*a* in this example are located along a scoring plane 815 and are presented on the front surfaces of three cube-shaped elements 851, 852, 853 (labeled in FIG. 8B).

During play, one or more icons 841*a*, 842*a*, 843*a* is presented on the display in a location corresponding to one of the lanes 831, 832, 833 and in variable sizes and positions, such that the icons 841*a*, 842*a*, 843*a* appear to be in motion from the distal location 848 toward one of the three key images 861*a*, 862*a*, 863*a*. The icons 841*a*, 842*a*, 843*a* are correlated with, or match, the key images 861*a*, 862*a*, 863*a*. For example, the fist-shaped first icon 841*a* in the first lane 831 matches the first key image 861*a* that is displayed on the first cube-shaped element 851. The two-finger vee-shaped second icon 842*a* in the second lane 832 matches the second key image 862*a*. The open hand third icon 843*a* in the third lane 833 matches the third key image 863*a*. The moving icons and their corresponding key images, in some implementations, may change at any time before the moving icon reaches the scoring plane and apparently collides with its corresponding key image.

The first key image 861*a* indicates the hand gesture to be made, the motion of the first icon 841*a* indicates the approaching time when the user must make the correct hand gesture, and the position of the first lane 831 indicates where the user's hand must be located—at the final time—in order to score a point. The final time occurs at the instant of an apparent collision between the first icon 841*a* (moving along the first lane 831) and the first key image 861*a* (located at the scoring plane 815). In this aspect, a point is earned if three conditions are satisfied: time, position, and hand shape. During play, if the user's final hand shape 616*a* is a location match (relative to the first key image 861*a*) and a shape match (relative to the first icon 841a)—both of which are evaluated at the final time, when the apparent collision occurs—then the user earns a point.

For example, in FIG. 8A, the final hand shape 616a is a location match because the hand is positioned near the first key image 861a. The final hand shape 616a is a shape match because the hand is making a fist, which matches the fist-shaped first icon 841a. The time condition is met because the final hand shape 616a is in the correct location and shape when the apparent collision occurs between the fist-shaped first icon 841a and the first key image 861a (at the scoring plane 815). Because all three conditions are met, a success highlight 871 (e.g., rays of light) is displayed near the apparent collision and the game score 804a is increased by one point.

FIG. 8B illustrates a turn in which the fist-shaped final hand shape 616b is not a shape match relative to the two-finger horn-shaped third icon 843b, as it crosses the scoring plane 815. Because all three conditions are not met, a failure highlight 872 (e.g., a letter X) is displayed near the apparent collision and the game score 804b is not increased.

As shown in FIG. 8B, there is no icon presented in the first lane 831. In this aspect, the moving icons may appear, or not, at any time before the moving icon reaches the scoring plane and apparently collides with its corresponding key image. The first key image 861b is fist-shaped; if and when a first icon appears in the first lane 831, it would be fist-shaped. The pointing-finger second icon 842b in the second lane 832 matches the pointing-finger second key image 862b. The two-finger horn-shaped third icon 843b in the third lane 833 matches the third key image 863b. At the time of the apparent collision, as shown, the moving third icon 843b is nearly coincident with the third key image 863b.

The icons and key images illustrated in FIGS. 8A and 8B, together with the virtual game pieces for Rock Paper Scissors illustrated in FIGS. 7A and 7B, illustrate some of the variety of hand gestures that may be suitable for the interactive games described herein.

Figure 9:
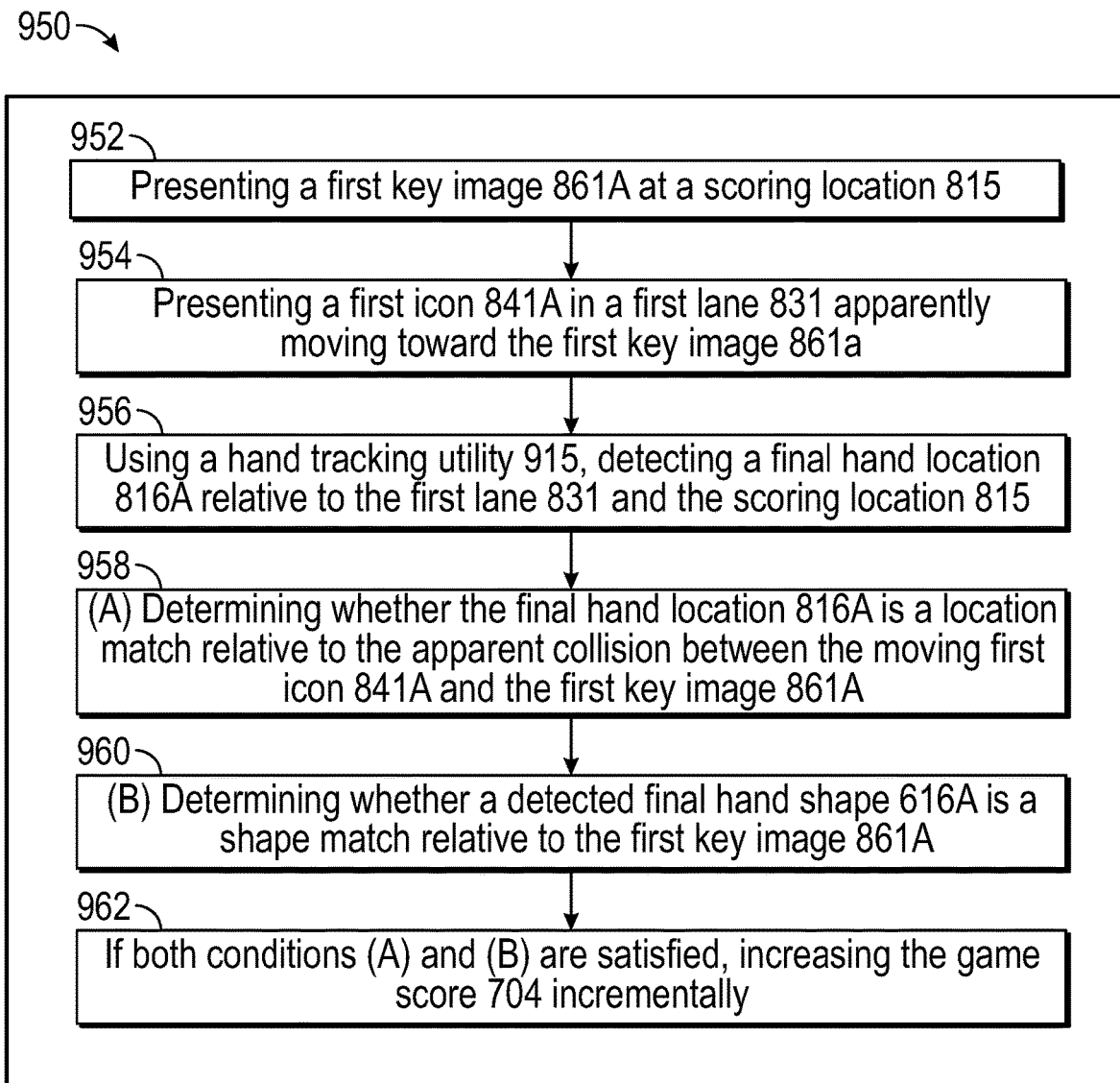
FIG. 9 is a flow chart listing the steps in an example method of presenting the second example interactive game of FIGS. 8A and 8B.

FIG. 9 is a flow chart 950 listing the steps in an example method of presenting the second example interactive game illustrated in FIGS. 8A and 8B.

Consistent with the interactive games described herein, any one of the moving icons 841a, 842a, 843a is similar in several aspects to the opposing final virtual game piece 720b described with reference to opponent device for the Rock Paper Scissors game. In this aspect, the Moving Icons game, in some implementations, includes one or more steps as described for the example method 650 of presenting the Rock Paper Scissors game, including capturing frames of video data and detecting a final hand shape.

At block 952, the processor 432, in executing the game application 910 on the eyewear device 100, presents on the display a first key image 861a at a scoring location 815. As shown in FIG. 8A, the first key image 861a may be presented on a surface, such as the face of a first cube-shaped element 851a.

At block 954, the processor 432 presents on the display a first icon 841a in a first lane 831 of a virtual scroll, as illustrated in FIGS. 8A and 8B. The first icon 841a appears to move from a distal location 848 toward the first key image 861a. The first icon 841a matches the first key image 861a.

The method, in some implementations, includes using the hand tracking utility 915 to analyze the frames of video, before the final time, to detect a preliminary hand shape at a current location relative to the display. In turn, the method also includes presenting on the display a preliminary virtual game piece, based on the detected preliminary hand shape.

In this aspect, during play, the user can see the preliminary virtual game piece selected and presented by the game application 910 before the first icon 841a apparently collides with the first key image 861a. If the preliminary virtual game piece appears to be correct, the user can maintain her preliminary hand shape (at the proper location) until the apparent collision occurs. If the preliminary virtual game piece appears to be incorrect, the user can change her preliminary hand shape before the apparent collision occurs.

At block 956, the processor 432, using a hand tracking utility 915, analyzes the frames of video and detects a final hand location 816a relative to the location of the first lane 831 at a final time. The final time, as described herein, is associated with an apparent collision between the moving first icon 841a and the first key image 861a. The hand tracking utility 915 also detects the final hand shape, as described herein.

At block 958, the processor 432 determines whether the final hand location 816a is a location match relative to the location of the apparent collision between the moving first icon 841a and the first key image 861a.

At block 960, the processor 432 determines whether the final hand shape 616a is a shape match relative to the first key image 861a.

At block 962, the processor 432 determines whether the location match is satisfied and whether the shape match is satisfied; if both conditions are satisfied, the game score 704 is increased by one point.

Although the method 950 is described with reference to a single first icon 841a and a single first key image 861a, the game application 910 in accordance with the game rules 480 may accommodate any number of moving icons, lanes, and key images. For example, several key images may lie along a scoring plane, as defined at least partially by the scoring location for any one of the key images. The icons may appear or disappear in any lane at any time. The icons may move at any apparent speed, constant or variable, along the lanes.

In both the Moving Icons game, illustrated in FIGS. 8A and 8B, and the Rock Paper Scissors game, illustrated in FIGS. 7A and 7B, the processor 432, in executing the game application 910 on the eyewear device 100, performs the task of detecting a final hand shape in the captured frames of video data. The hand tracking utility 915, in some implementations, generates a bounding box near the detected final hand shape. Example bounding boxes 730a, 730b, 830a, 830b are shown in FIGS. 7A, 7B, 8A and 8B; however, the bounding box may or may not be presented on the display for viewing by the user. The bounding box, in some implementations, represents a region for analysis which is smaller than the entire digital image, thus conserving computing resources. Generating the bounding box, in some implementations, involves detecting a palm of a hand, in any orientation, with all or part of the palm visible (e.g., palmar side, dorsal side, lateral edge, or combinations thereof). Within a bounding box, the hand tracking utility 915, in some implementations, identifies a set of hand landmarks based on the pixel-level depth information contained in the frame of digital video data. The set of hand landmarks, for example, may include three-dimensional coordinates for as many as all fifteen of the interphalangeal joints, the five fingertips, and the wrist at its articulation points, as well as other skeletal and soft-tissue landmarks. The hand tracking utility 915, in some implementations, selects a candidate hand gesture from a hand gesture library 488 by comparing the identified set of hand landmarks to the data about the variety of hand gestures stored in the library

488. Based on the selected candidate hand gesture, the hand tracking utility 915, in some implementations, selects a virtual game piece from the collection of virtual game pieces 482.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of presenting an interactive game in augmented reality, said method comprising:
   capturing frames of video data with a camera, wherein each frame of video data comprises depth information for a plurality of pixels, and wherein said camera is coupled to an eyewear device comprising a processor, a memory, a hand tracking utility, and a display;
   presenting a game clock on said display at a location establishing a field of play, wherein said field of play is persistently viewable as an overlay relative to a physical environment, independent of movement of said eyewear device, and wherein said game clock is configured to increment from a start time to a final time;
   detecting in said frames of video data, with said hand tracking utility, a final hand shape associated with said final time;
   identifying a set of hand landmarks associated with said detected final hand shape, based on said depth information;
   selecting a candidate hand gesture from a library of hand gestures based on said identified set of hand landmarks;
   selecting a final virtual game piece from a set of virtual game pieces based on said selected candidate hand gesture;
   presenting on said display said final virtual game piece as an overlay relative to said final hand shape;

broadcasting wirelessly said final virtual game piece;
detecting an opposing final virtual game piece; and
presenting on said display a game score based on said final virtual game piece versus said opposing final virtual game piece.

2. The method of claim 1, further comprising:
detecting in said captured frames of video data, with said hand tracking utility and before said final time on said game clock, a preliminary hand shape; and
presenting on said display a preliminary virtual game piece based on said detected preliminary hand shape.

3. The method of claim 2, wherein said step of presenting a game clock further comprises:
synchronizing said game clock with an opponent device comprising an opponent display, such that said game clock presents and increments simultaneously on said display and said opponent display;
initiating said game clock at said start time on both said displays in response to detecting in said captured frames of video data a start signal; and
presenting on said display said opposing final virtual game piece within said field of play and spaced apart from said final virtual game piece, wherein said opposing final virtual game piece is broadcast from said opponent device.

4. The method of claim 3, wherein said game score comprises a user score and an opponent score, and wherein said step of presenting a game score further comprises:
determining whether a value associated with said final virtual game piece is greater than an opposing value associated with said opposing final virtual game piece;
in response to determining said value is greater than said opposing value, incrementing said user score by one;
in response to determining said value is less than said opposing value, incrementing said opponent score by one;
in response to determining said value is equal to said opposing value, incrementing neither said user score nor said opponent score;
presenting on said display a highlight near said incremented score;
initiating, after a pause for an adjustable duration, said game clock at a subsequent start time on both said displays.

5. The method of claim 1, wherein said step of detecting a final hand shape further comprises:
detecting said final hand shape in a first frame of said captured frames of video data;
generating a bounding box near said detected final hand shape relative to said first frame, wherein said bounding box comprises first depth information for a first plurality of pixels; and
identifying said set of hand landmarks based on said first depth information;
wherein said library of hand gestures and said set of virtual game pieces comprises:
a fist gesture associated with a virtual fist-like game piece;
an open-hand gesture associated with a virtual open-hand game piece; and
a two-finger vee gesture associated with a virtual two-finger vee game piece.

6. The method of claim 1, wherein said opposing final virtual game piece comprises a first icon, said method further comprising:
presenting on said display a first key image at a scoring location;
presenting on said display said first icon on a first lane of a virtual scroll that appears to move from a distal location toward said first key image at said scoring location, wherein said first icon persistently matches said first key image;
detecting in said captured frames of video data, before said final time, a preliminary hand shape at a current location relative to said display; and
presenting on said display, at said current location as an overlay relative to said preliminary hand shape, a preliminary virtual game piece based on said detected preliminary hand shape,
wherein said step of detecting a final hand shape further comprises: detecting a final hand location relative to said first lane, wherein said final time is further associated with an apparent collision between said moving first icon and said first key image;
wherein said step of presenting a game score further comprises: (a) determining whether said detected final hand location is a location match relative to said apparent collision in said first lane, (b) determining whether said detected final hand shape is a shape match relative to said first key image, and (c) in response to determining both said shape match and said location match, incrementing said game score by one.

7. The method of claim 6, further comprising:
presenting a subsequent key image at a subsequent location along a scoring plane defined relative to said scoring location;
presenting a subsequent icon on a secondary lane of said virtual scroll, wherein said subsequent icon persistently matches said subsequent key image;
detecting, at a subsequent final time, a subsequent final hand location relative to said secondary lane, wherein said final time is further associated with a subsequent apparent collision between said moving subsequent icon and said subsequent key image;
determining whether said detected subsequent final hand location is a subsequent location match relative to said subsequent apparent collision in said secondary lane;
determining whether a subsequent final hand shape is a subsequent shape match relative to said subsequent key image; and
in response to determining both said subsequent shape match and said subsequent location match, incrementing said game score by one.

8. The method of claim 6, wherein said library of hand gestures and said set of virtual game pieces comprises:
a fist gesture associated with a virtual fist-like game piece, a fist-shaped key image, and a fist-shaped icon;
an open-hand gesture associated with a virtual open-hand game piece, a hand-shaped key image, and a hand-shaped icon;
a two-finger vee gesture associated with a virtual two-finger vee game piece, a vee-shaped key image, and a vee-shaped icon;
a pointing gesture associated with a virtual pointing-finger game piece, a pointing key image, and a pointing key icon; and
a two-finger horns gesture associated with a virtual two-finger horns game piece, a two-finger key image, and a two-finger key icon.

9. An interactive game presentation system, comprising:
an eyewear device comprising a processor, a memory, a camera, a hand tracking utility, and a display;

programming in said memory, wherein execution of said programming by said processor configured said eyewear device to perform functions, including functions to:

capture frames of video data with said camera, wherein each frame of video data comprises depth information for a plurality of pixels;

present a game clock on said display at a location establishing a field of play, wherein said field of play is persistently viewable as an overlay relative to a physical environment, independent of movement of said eyewear device, and wherein said game clock is configured to increment from a start time to a final time;

detect in said frames of video data, with said hand tracking utility, a final hand shape associated with said final time;

identify a set of hand landmarks associated with the detected final hand shape, based on said depth information;

select a candidate hand gesture from a library of hand gestures based on said identified set of hand landmarks;

select a final virtual game piece from a set of virtual game pieces based on said selected candidate hand gesture;

present on said display said final virtual game piece as an overlay relative to said final hand shape;

broadcast wirelessly said final virtual game piece;

detect an opposing final virtual game piece; and present on said display a game score based on said final virtual game piece versus said opposing final virtual game piece.

10. The system of claim 9, wherein said execution of said programming further configures said eyewear device to:

detect in said captured frames of video data, with said hand tracking utility and before said final time on said game clock, a preliminary hand shape; and present on said display a preliminary virtual game piece based on said detected preliminary hand shape.

11. The system of claim 10, wherein said execution of said programming further configures said eyewear device to:

synchronize said game clock with an opponent device comprising an opponent display, such that said game clock presents and increments simultaneously on said display and said opponent display;

initiate said game clock at said start time on both said displays in response to detecting in said captured frames of video data a start signal; and present on said display said opposing final virtual game piece within said field of play and spaced apart from said final virtual game piece, wherein said opposing final virtual game piece is broadcast from said opponent device.

12. The system of claim 11, wherein said game score comprises a user score and an opponent score, and wherein said execution of said programming further configures said eyewear device to:

determine whether a value associated with said final virtual game piece is greater than an opposing value associated with said opposing final virtual game piece;

in response to determining said value is greater than said opposing value, increment said user score by one;

in response to determining said value is less than said opposing value, increment said opponent score by one;

in response to determining said value is equal to said opposing value, increment neither said user score nor said opponent score;

present on said display a highlight near said incremented score;

initiate, after a pause for an adjustable duration, said game clock at a subsequent start time on both said displays.

13. The system of claim 9, wherein said execution of said programming further configures said eyewear device to:

detect, with said hand tracking utility, said final hand shape in a first frame of said captured frames of video data;

generate a bounding box near said detected final hand shape relative to said first frame, wherein said bounding box comprises first depth information for a first plurality of pixels; and identify said set of hand landmarks based on said first depth information;

wherein said library of hand gestures and said set of virtual game pieces comprises:

a fist gesture associated with a virtual fist-like game piece;

an open-hand gesture associated with a virtual open-hand game piece; and a two-finger vee gesture associated with a virtual two-finger vee game piece.

14. The system of claim 9, wherein said opposing final virtual game piece comprises a first icon, and wherein said execution of said programming further configures said eyewear device to:

present on said display a first key image at a scoring location;

present on said display said first icon on a first lane of a virtual scroll that appears to move from a distal location toward said first key image at said scoring location, wherein said first icon persistently matches said first key image;

detect in said captured frames of video data, with said hand tracking utility and before said final time, a preliminary hand shape at a current location relative to said display; and present on said display, at said current location as an overlay relative to said preliminary hand shape, a preliminary virtual game piece based on said detected preliminary hand shape;

detect a final hand location, associated with said final hand shape and relative to said first lane, wherein said final time is further associated with an apparent collision between said moving first icon and said first key image;

determine whether said detected final hand location is a location match relative to said apparent collision in said first lane;

determine whether said detected final hand shape is a shape match relative to said first key image; and in response to determining both said shape match and said location match, increment said game score by one.

15. The system of claim 14, wherein said execution of said programming further configures said eyewear device to:

present a subsequent key image at a subsequent location along a scoring plane defined relative to said scoring location;

present a subsequent icon on a secondary lane of said virtual scroll, wherein said subsequent icon persistently matches said subsequent key image;

detect, at a subsequent final time, a subsequent final hand location relative to said secondary lane, wherein said final time is further associated with a subsequent apparent collision between said moving subsequent icon and said subsequent key image;

determine whether said detected subsequent final hand location is a subsequent location match relative to said subsequent apparent collision in said secondary lane;

determine whether a subsequent final hand shape is a subsequent shape match relative to said subsequent key image; and in response to determining both said subsequent shape match and said subsequent location match, increment said game score by one.

16. The system of claim 15, wherein said library of hand gestures and said set of virtual game pieces comprises:

a fist gesture associated with a virtual fist-like game piece, a fist-shaped key image, and a fist-shaped icon;

an open-hand gesture associated with a virtual open-hand game piece, a hand-shaped key image, and a hand-shaped icon;

a two-finger vee gesture associated with a virtual two-finger vee game piece, a vee-shaped key image, and a vee-shaped icon;

a pointing gesture associated with a virtual pointing-finger game piece, a pointing key image, and a pointing key icon; and a two-finger horns gesture associated with a virtual two-finger horns game piece, a two-finger key image, and a two-finger key icon.

17. A non-transitory computer-readable medium storing program code which, when executed, is operative to cause an electronic processor to perform the steps of:

capturing frames of video data with a camera, wherein each frame of video data comprises depth information for a plurality of pixels, and wherein said camera is coupled to an eyewear device comprising a processor, a memory, a hand tracking utility, and a display;

presenting a game clock on said display at a location establishing a field of play, wherein said field of play is persistently viewable as an overlay relative to a physical environment, independent of movement of said eyewear device, and wherein said game clock is configured to increment from a start time to a final time;

detecting in said frames of video data, with said hand tracking utility, a final hand shape associated with said final time;

identifying a set of hand landmarks associated with said detected final hand shape, based on said depth information;

selecting a candidate hand gesture from a library of hand gestures based on said identified set of hand landmarks;

selecting a final virtual game piece from a set of virtual game pieces based on said selected candidate hand gesture;

presenting on said display said final virtual game piece as an overlay relative to said final hand shape;

broadcasting wirelessly said final virtual game piece;

detecting an opposing final virtual game piece; and presenting on said display a game score based on said final virtual game piece versus said opposing final virtual game piece.

18. The non-transitory computer-readable medium storing program code of claim 17, wherein said program code, when executed, is operative to cause an electronic processor to perform the further steps of:

detecting in said captured frames of video data, with said hand tracking utility and before said final time on said game clock, a preliminary hand shape; and presenting on said display a preliminary virtual game piece based on said detected preliminary hand shape.

19. The non-transitory computer-readable medium storing program code of claim 18, wherein said program code, when executed, is operative to cause an electronic processor to perform the further steps of:

synchronizing said game clock with an opponent device comprising an opponent display, such that said game clock presents and increments simultaneously on said display and said opponent display;

initiating said game clock at said start time on both said displays in response to detecting in said captured frames of video data a start signal; and presenting on said display said opposing final virtual game piece within said field of play and spaced apart from said final virtual game piece, wherein said opposing final virtual game piece is broadcast from said opponent device.

20. The non-transitory computer-readable medium storing program code of claim 17, wherein said opposing final virtual game piece comprises a first icon, and wherein said program code, when executed, is operative to cause an electronic processor to perform the further steps of:

presenting on said display a first key image at a scoring location;

presenting on said display said first icon on a first lane of a virtual scroll that appears to move from a distal location toward said first key image at said scoring location, wherein said first icon persistently matches said first key image;

detecting in said captured frames of video data, before said final time, a preliminary hand shape at a current location relative to said display; and presenting on said display, at said current location as an overlay relative to said preliminary hand shape, a preliminary virtual game piece based on said detected preliminary hand shape, wherein said step of detecting a final hand shape further comprises: detecting a final hand location relative to said first lane, wherein said final time is further associated with an apparent collision between said moving first icon and said first key image;

wherein said step of presenting a game score further comprises: (a) determining whether said detected final hand location is a location match relative to said apparent collision in said first lane, (b) determining whether said detected final hand shape is a shape match relative to said first key image, and (c) in response to determining both said shape match and said location match, incrementing said game score by one.

\* \* \* \* \*